United States Patent Office 3,102,133
Patented Aug. 27, 1963

3,102,133
1-[5-(6-METHOXY-2-NAPHTHYL)-2-OXYCYCLO-
PENTYL]-2-PROPANONE DERIVATIVES
Leland J. Chinn, Morton Grove, Ill., assignor to G. D.
Searle & Co., Chicago, Ill., a corporation of Delaware
No Drawing. Filed Dec. 11, 1961, Ser. No. 158,527
8 Claims. (Cl. 260—488)

This invention relates to 1-[5-(6-methoxy-2-naphthyl)-2-oxycyclopentyl]-2-propanone derivatives and processes for the manufacture thereof. More particularly, this invention relates to new and useful chemical compounds of the formula

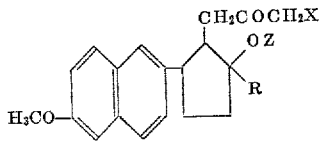

wherein X represents hydrogen, hydroxyl, halogen, or an alkanoyloxy radical; Z represents hydrogen or an alkanoyl radical; and R represents hydrogen or an alkyl radical. By "halogen" is of course meant fluorine, chlorine, bromine, or iodine.

Among the alkanoyloxy and alkanoyl radicals represented by X and Z in the foregoing formula, especially lower alkanoyloxy and alkanoyl radicals are preferred, which is to say radicals of the formulas, respectively, alkyl-COO— and alkyl-CO— wherein the alkyl constituents are of lower order, namely, methyl, ethyl, propyl, isopropyl, butyl, isobutyl, sec-butyl, tert-butyl, pentyl, neopentyl, hexyl, isohexyl, heptyl, and like saturated, monovalent, acyclic, straight- or branched-chain hydrocarbon groupings of the formula $C_nH_{2n+1}$ in which $n$ represents a positive integer less than 9. Such lower alkyl radicals are not only preferred constituents of the groupings represented by X and Z as shown, but, together with hydrogen, are preferred embodiments of R in the first formula above as well.

Equivalent to the 1-hydroxy-3-[5-(6-methoxy-2-naphthyl)-2-oxycyclopentyl]-2-propanone derivatives are the side-chain esters thereof with sulfuric, phosphoric, and like acids illustrated hereinafter by Example 3.

The compounds to which this invention relates are useful because of their valuable pharmacological properties. Thus, for example, they are antibiotics variously effective against bacteria such as *Diplococcus pneumoniae*, algae such as *Chlorella vulgaris*, and cotyledenous seed germination. They are also adapted to block the effect of desoxycorticosterone acetate on urinary sodium and potassium.

The 1-alkanoyloxy-3-[5-(6-methoxy-2-naphthyl)-2-oxy-cyclopentyl]-2-propanones hereof are prepared by warming oxalyl chloride with a compound of the formula

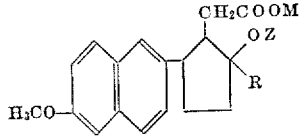

Z and R being defined as before and M representing hydrogen except when OZ represents a tertiary hydroxyl, in which case M is preferably sodium and an inert liquid medium such as benzene is desirably present. The cyclopentaneacetyl chloride which results is converted in cold anhydrous benzene solution to the corresponding diazo compound

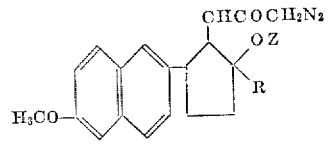

with ethereal diazomethane, from which the 1-alkanoyloxy compound of choice

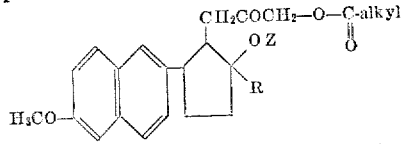

eventuates on heating with the appropriate alkanoic acid.

The latter compounds are hydrolyzed with hot alcoholic hydrochloric acid or, if a tertiary hydroxyl be present or in prospect, with methanolic sodium methoxide at room temperatures under nitrogen to give the diols hereof.

The 1-chloro-3-[2-alkanoyloxy-5-(6-methoxy-2 - naphthyl)cyclopentyl]-2-propanones of the invention are obtained from the apposite 1-diazo compounds

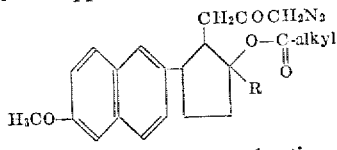

(R being defined as before) on heating briefly with hydrochloric acid in dioxane solution; the corresponding 1-bromo and 1-iodo compounds in turn are derived from the 1-chloro compounds by displacing the chlorine in boiling acetonic sodium bromide or iodide, respectively; and the 1-fluoro compounds are prepared from the 1-iodo compounds by heating with silver fluoride. These halo compounds afford the corresponding 2-hydroxy compounds hereof by saponification with methanolic sodium methoxide. Alternatively, and preferably where a tertiary hydroxyl is not involved, hot alcoholic hydrochloric acid will serve to cleave the alkanoyloxy linkage.

Finally, the 1-[2-alkanoyloxy-5-(6-methoxy - 2 - naphthyl)cyclopentyl]-2-propanones of this invention are prepared by dehalogenating the corresponding iodo compounds

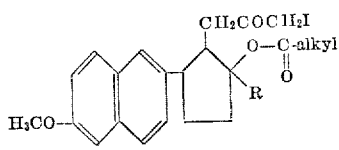

with (effectively) hydriodic acid; and the resultant products are converted to the 2-hydroxy derivatives by hydrolysis either with hot alcoholic hydrochloric acid or methanolic sodium methoxide as aforesaid.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

*Example 1*

A. *2 - acetoxy-5-(6-methoxy-2-naphthyl)cyclopentaneacetyl chloride.*—A mixture of approximately 4 parts of 2-acetoxy - 5 - (6 - methoxy - 2 - naphthyl)cyclopentaneacetic acid and 18 parts of oxalyl chloride is heated rapidly to 50° and then allowed to stand at room temperature for 2 hours. The resultant orange-red solution is freed of excess oxalyl chloride by vacuum distillation, and the residue is crystallized from a mixture of anhydrous benzene and hexane to afford nearly colorless plates of 2-acetoxy - (6 - methoxy - 2 - naphthyl)cyclopentaneacetyl chloride melting at 111.5–115°.

B. *1-[2 - acetoxy - 5 - (6-methoxy-2-naphthyl)cyclopentyl]-3-diazo-2-propanone.*—To an ethereal solution of diazomethane prepared by interaction of 18 parts of N-nitrosomethylurea, 36 parts of potassium hydroxide, and 36 parts of water in 125 parts of ether is carefully added a solution of approximately 4 parts of 2-acetoxy-5-(6-methoxy - 2 - naphthyl)cyclopentaneacetyl chloride in 18 parts of anhydrous benzene, temperatures of the order of 5° being maintained throughout the addition and for 2 hours thereafter. The reaction mixture is then filtered, and the filtrate is concentrated to a viscous oil by vacuum distillation. The oil solidifies on standing at 5° and, recrystallized from a mixture of ether and pentane, affords 1-[2-acetoxy-5-(6-methoxy - 2 - naphthyl)cyclopentyl]-3-diazo-2-propanone melting at 93–98° with gas evolution.

C. *1 - acetoxy - 3 - [2 - acetoxy - 5 - (6 - methoxy-2-naphthyl)cyclopentyl]-2-propanone.*—A solution of approximately 4 parts of 1-[2-acetoxy-5-(6-methoxy-2-naphthyl)cyclopentyl]-3-diazo-2-propanone in 120 parts of glacial acetic acid is heated at the boiling point under reflux for 5 minutes and then concentrated nearly to dryness by vacuum distillation. The residual oil is mixed with 5 volumes of water. The resultant mixture is cooled at 5° until the oil solidifies. The solid thus obtained is collected by filtration, washed well with water, dried in air, and chromatographed on silica gel, using benzene and ethyl acetate as developing solvents. From an eluate comprising 5% ethyl acetate in benzene there is obtained, upon evaporation of solvent, 1-acetoxy-3-[2-acetoxy - 5 - (6 - methoxy - 2 - naphthyl)cyclopentyl]-2-propanone, which crystallizes from ether as colorless platelets melting at 109.5–111.5°. The product has the formula

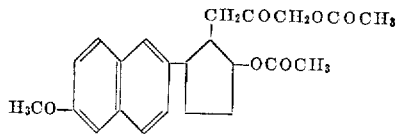

*Example 2*

*1 - hydroxy - 3 - [2 - hydroxy - 5 - (6-methoxy-2-naphthyl)-cyclopentyl]-2-propanone.*—A mixture of 5 parts of 1 - acetoxy - 3 - [2 - acetoxy - 5 - (6 - methoxy - 2 - naphthyl)cyclopentyl]-2-propanone, 200 parts of 95% ethanol, 240 parts of water, and 28 parts of concentrated hydrochloric acid is heated at the boiling point under reflux in an atmosphere of nitrogen for 2¼ hours. Approximately 24 parts of pyridine is then introduced, and the resultant mixture is freed of ethanol by vacuum distillation. The residue is diluted with water, and the mixture thus obtained is saturated with solid sodium chloride and cooled to 5°. The solid thrown down is filtered off, washed well with water, dried in air, and recrystallized from a mixture of acetone and ether to give colorless plates of 1-hydroxy-3-[2-hydroxy-5-(6-methoxy-2-naphthyl)cyclopentyl]-2-propanone melting at approximately 130–131°. The product has the formula

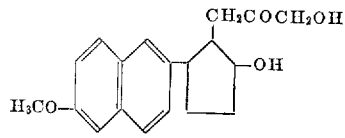

*Example 3*

*1 - [2 - acetoxy - 5 - (6 - methoxy - 2 - naphthyl)cyclopentyl] - 3 - dihydroxyphosphinyloxy - 2 - propanone.*—To a solution of 1 part of crystalline phosphoric acid—previously heated at 150° under 0.1 mm. pressure for 1 hour and then cooled to room temperature—in 20 parts of dioxane is added a solution of approximately 2 parts of 1 - [2 - acetoxy-5-(6-methoxy-2-naphthyl)cyclopentyl]-3-diazo-2-propanone in 16 parts of dioxane. The resultant mixture is maintained at 50° for 10 minutes and then stripped of solvent by vacuum distillation. The residue is extracted with ethyl acetate. The ethyl acetate extract is washed with water and dried over anhydrous sodium sulfate. Evaporation of solvent affords as the residue 1-[2 - acetoxy - 5 - (6 - methoxy - 2 - naphthyl)cyclopentyl]-3-dihydroxyphosphinyloxy-2-propanone, the formula of which is

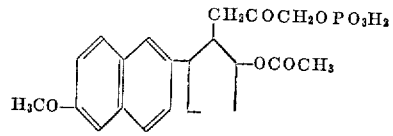

*Example 4*

*1 - [2-acetoxy-5-(6-methoxy-2-naphthyl)cyclopentyl]-3-chloro-2-propanone.*—To a solution of 5 parts of 1-[2-acetoxy - 5-(6-methoxy-2-naphthyl)cyclopentyl]-3-diazo-2-propanone in 30 parts of dioxane is added 12 parts of concentrated hydrochloric acid. The resultant mixture is warmed momentarily to 60° and then diluted with 5 volumes of water. The mixture thus obtained is cooled to 5°, whereupon the oil therein solidifies. The solid matter is filtered off, washed with water, dried in air, and crystallized from a mixture of ether and pentane to give colorless nondescript crystals of 1-[2-acetoxy-5-(6-methoxy-2-naphthyl)cyclopentyl]-3-chloro-2-propanone melting at 96–104.5°. The product has the formula

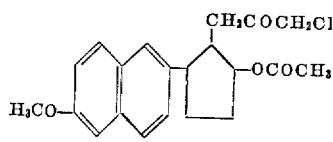

*Example 5*

*1 - [2-acetoxy-5-(6-methoxy-2-naphthyl)cyclopentyl]-3-iodo-2-propanone.*—A mixture of approximately 2 parts of 1-[2-acetoxy-5-(6-methoxy-2-naphthyl)cyclopentyl]-3-chloro-2-propanone, 180 parts of acetone, and 12 parts of sodium iodide is heated at the boiling point under reflux for 1½ hours. The resultant mixture is concentrated nearly to dryness by vacuum distillation, and the residue is partitioned between ethyl acetate and water. The ethyl acetate phase is separated, successively washed with water and saturated aqueous sodium chloride, dried over anhydrous sodium sulfate, and stripped of solvent by vacuum distillation. The residue, a brown-red viscous oil, is 1-[2- acetoxy - 5-(6-methoxy-2-naphthyl)cyclopentyl]-3-iodo-2-propanone, of the formula

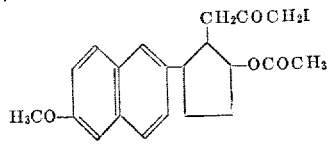

Example 6

*1 - [2-acetoxy-5-(6-methoxy-2-naphthyl)cyclopentyl]-3-fluoro-2-propanone.*—To a solution of approximately 2 parts of 1-[2-acetoxy-5-(6-methoxy-2-naphthyl)cyclopentyl]-3-iodo-2-propanone in 117 parts of acetonitrile is added 9 parts of silver fluoride. The resultant mixture is heated at the boiling point under reflux for 16 hours and then filtered. The filtrate is concentrated to one-tenth its original volume by vacuum distillation and then taken up in ethyl acetate. The ethyl acetate solution is washed with water, dried over anhydrous sodium sulfate, and stripped of solvent by vacuum distillation. The dark brown, viscous, oily residue is chromatographed on silica gel, using benzene and ethyl acetate as developing solvents. From an eluate comprising 10% ethyl acetate in benzene, upon evaporation of solvent, is obtained 1-[2-acetoxy-5-(6-methoxy-2-naphthyl)cyclopentyl]-3-fluoro-2-propanone, which crystallizes from a mixture of ether and pentane, as colorless, densely packed platelets melting at 109.5–113°. The product has the formula

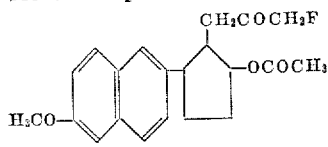

Example 7

*1 - chloro-3-[2-hydroxy-5-(6-methoxy-2-naphthyl)-cyclopentyl]-2-propanone.*—A solution of approximately 11 parts of 1-[2-acetoxy-5-(6-methoxy-2-naphthyl)cyclopentyl]-3-chloro-2-propanone, 500 parts of 95% ethanol, 650 parts of water, and 75 parts of concentrated hydrochloric acid is heated at the boiling point under reflux in an atmosphere of nitrogen for 2¼ hours. Approximately 75 parts of pyridine is then introduced, and the resultant mixture is freed of ethanol by vacuum distillation. The residue is diluted with water, and the mixture thus obtained is saturated with solid sodium chloride and extracted with ethyl acetate. The ethyl acetate extract is washed with a saturated solution of sodium chloride, dried over anhydrous sodium sulfate, and freed of solvent by distillation. The residual oil is chromatographed on silica gel, using benzene and ethyl acetate as developing solvents. From an eluate comprising 10% ethyl acetate in benzene, upon evaporation of solvent, there results as the residue 1-chloro-3-[2-hydroxy-5-(6-methoxy-2-naphthyl)cyclopentyl]-2-propanone, which crystallizes from a mixture of ether and pentane as colorless platelets melting at 84–87°. The product has the formula

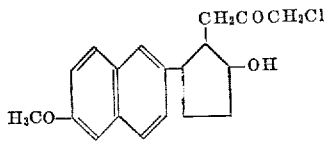

Example 8

*1 - fluoro-3-[2-hydroxy-5-(6-methoxy-2-naphthyl)-cyclopentyl]-2-propanone.*—Substitution of 5 parts of 1-[2-acetoxy-5-(6-methoxy-2-naphthyl)cyclopentyl]-3-fluoro-2-propanone for the 1-acetoxy-3-[2-acetoxy-5-(6-methoxy-2-naphthyl)cyclopentyl]-2-propanone called for in Example 2 and use of a mixture of ether and pentane rather than ether and acetone as recrystallizing solvent affords, by a procedure otherwise identical with that detailed in Example 2, 1-fluoro-3-[2-hydroxy-5-(6-methoxy-2-naphthyl)cyclopentyl]-2-propanone as flat colorless needles melting at approximately 106.5–107°. The product has the formula

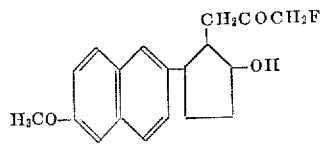

Example 9

*1 - [2 - acetoxy - 5 - (6 - methoxy - 2 - naphthyl)cyclopentyl]-2-propanone.*—A mixture of 1 part of 1-[2-acetoxy - 5 - (6 - methoxy - 2 - naphthyl)cyclopentyl]-3-chloro-2-propanone, 4 parts of sodium iodide, and 60 parts of acetone is heated at the boiling point under reflux for 1½ hours and then distilled nearly to dryness under reduced pressure. Approximately 15 parts of glacial acetic acid is added to the residue, and the resultant mixture is maintained with agitation at room temperatures for 1 hour. It is then poured into 500 parts of water containing, in solution, 6 parts of sodium thiosulfate pentahydrate and 30 parts of sodium bicarbonate. The mixture thus obtained is extracted with chloroform. The chloroform extract is washed successively with a dilute aqueous solution of sodium thiosulfate and water, dried over anhydrous sodium sulfate, and substantially stripped of solvent by distillation. The semi-solid residue, crystallized from a mixture of ether and pentane, affords 1-[2-acetoxy-5-(6-methoxy-2-naphthyl)cyclopentyl]-2-propanone as colorless dense crystals melting at 96.5–99.5°. The product has the formula

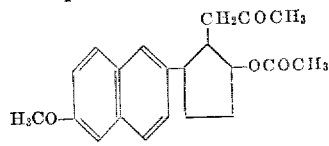

Example 10

*1 - [2 - hydroxy - 5 - (6 - methoxy - 2 - naphthyl)cyclopentyl]-2-propanone.*—Substitution of 5 parts of 1-[2 - acetoxy - 5 - (6 - methoxy - 2 - naphthyl)cyclopentyl]-2-propanone for the 1-acetoxy-3-[2-acetoxy-5-(6-methoxy-2-naphthyl)cyclopentyl]-2-propanone called for in Example 2 and use of a mixture of ether and pentane rather than ether and acetone as recrystallizing solvent affords, by a procedure otherwise identical with that detailed in Example 2, 1-[2-hydroxy-5-(6-methoxy-2-naphthyl)cyclopentyl]-2-propanone as colorless plates melting at 89.5–92.5°. The product has the formula

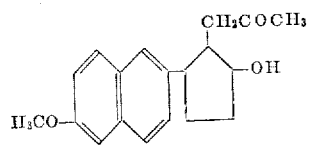

Example 11

A. *2 - hydroxy - 5 - (6 - methoxy - 2 - naphthyl) - 2-methylcyclopentaneacetyl chloride.*—To a solution of approximately 6 parts of 2-hydroxy-5-(6-methoxy-2-naphthyl)-2-methylcyclopentaneacetic acid and 160 parts of methanol is added a solution of 1 part of sodium hydroxide in a mixture of 5 parts of water and 12 parts of methanol. The resultant mixture is evaporated to dryness at around 90° in a nitrogen atmosphere. The solid residue is washed with hot ethyl acetate and then covered with 180 parts of anhydrous benzene. To this mixture is added 6 parts of oxalyl chloride. The mixture thus obtained is let stand at room temperatures until evolution of gas ceases, whereupon it is distilled to dryness in vacuo. Residual moisture is removed from the residue by distilling therefrom, in vacuo, an additional 80 parts of anhydrous benzene. The residue thus obtained is 2-hydroxy-5-(6-methoxy-2-naphthyl)-2-methyl-cyclopentaneacetyl chloride.

B. *1 - diazo - 3 - [2 - hydroxy - 5 - (6 - methoxy - 2-naphthyl) - 2 - methylcyclopentyl] - 2 - propanone.*—To a clear solution of approximately 6 parts of 2-hydroxy-5-(6 - methoxy - 2 - naphthyl) - 2 - methylcyclopentane-acetyl chloride in 180 parts of anhydrous benzene is added an ethereal solution of diazo methane prepared from 70 parts of N-nitrosomethylurea, 140 parts of potassium hydroxide, 140 parts of water, and 560 parts of ether, temperatures of the order of 5° being maintained throughout the addition and for approximately 1½ hours thereafter. The resultant mixture is distilled to dryness in vacuo. The residue, a viscous oil, is the desired 1-diazo - 3 - [2 - hydroxy - 5 - (6 - methoxy - 2 - naphthyl)-2-methylcyclopentyl]-2-propanone.

C. *1 - acetoxy - 3 - [2 - hydroxy - 5 - (6 - methoxy - 2-naphthyl)-2-methylcyclopentyl]-2-propanone.*—A solution of approximately 6 parts of 1-diazo-3-[2-hydroxy-5-(6 - methoxy - 2 - naphthyl) - 2 - methylcyclopentyl]-2-propanone in 200 parts of glacial acetic acid is heated at the boiling point under reflux for 5 minutes. The resultant mixture is distilled to dryness in vacuo. The residue is mixed with water and extracted with ether. The ether extract is washed with water, dried over anhydrous sodium sulfate, and stripped of solvent by distillation. The residue is 1-acetoxy-3-[2-hydroxy-5-(6-methoxy - 2 - naphthyl) - 2 - methylcyclopentyl] - 2-propanone, having the formula

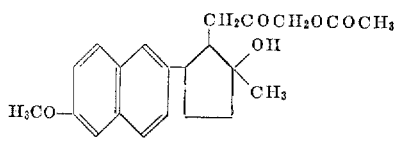

*Example 12*

*1 - hydroxy - 3 - [2 - hydroxy - 5 - (6 - methoxy - 2-naphthyl) - 2 - methylcyclopentyl]-2-propanone.*—A mixture of 4 parts of 1-acetoxy-3-[2-hydroxy-5-(6-methoxy-2-naphthyl)-2-methylcyclopentyl]-2-propanone, 1 part of sodium methoxide, and 320 parts of methanol is let stand at room temperatures in an atmosphere of nitrogen for 4 hours. The resultant mixture is diluted with an equal volume of water, and the mixture thus obtained is substantially freed of alcohol by vacuum distillation. The residue is saturated with solid sodium chloride, and the mixture thus obtained is extracted with ethyl acetate. The ethyl acetate is washed with a saturated solution of sodium chloride, dried over anhydrous sodium sulfate, and stripped of solvent by distillation. The residue is the desired 1-hydroxy-3-[2-hydroxy-5-(6-methoxy - 2 - naphthyl)-2-methylcyclopentyl]-2-propanone, having the formula

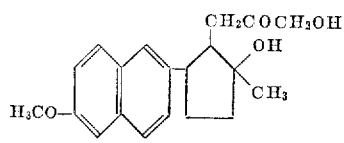

What is claimed is:
1. A compound of the formula

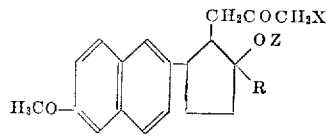

wherein X represents a member of the group consisting of hydrogen, hydroxyl, halogen, and radicals having the formula

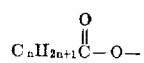

Z represents a member of the group consisting of hydrogen and radicals having the formula

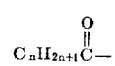

and R represents a member of the group consisting of hydrogen and radicals having the formula

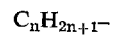

$n$ being a positive integer less than 8.

2. 1-acetoxy-3-[2-acetoxy-5-(6-methoxy - 2 - naphthyl) cyclopentyl]-2-propanone.

3. 1-hydroxy-3-[2-hydroxy-5-(6-methoxy-2 - naphthyl) cyclopentyl]-2-propanone.

4. A compound of the formula

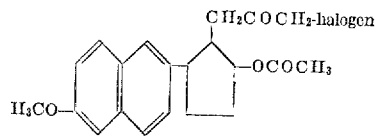

5. 1-[2-acetoxy-5-(6-methoxy - 2 - naphthyl)cyclopentyl]-3-chloro-2-propanone.

6. A compound of the formula

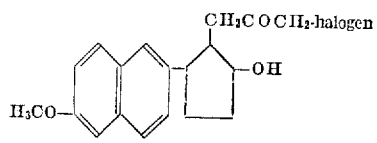

7. 1-fluoro-3-[2-hydroxy-5-(6-methoxy - 2 - naphthyl) cyclopentyl]-2-propanone.

8. 1-[2-acetoxy-5-(6-methoxy - 2 - naphthyl)cyclopentyl]-2-propanone.

No references cited.

UNITED STATES PATENT OFFICE
CERTIFICATE OF CORRECTION

Patent No. 3,102,133　　　　　　　　　　　　August 27, 1963

Leland J. Chinn

It is hereby certified that error appears in the above numbered patent requiring correction and that the said Letters Patent should read as corrected below.

Column 2, lines 7 to 11, for that portion of the formula reading column 3, line 22, for "acetoxy-(6-" read -- acetoxy-5-(6- --; line 66, for "thyl)-" read --thyl) --; column 4, lines 33 to 38, for that portion of the formula reading

column 6, line 61, for "solntion" read -- solution --; column 8, lines 31, 33 and 55, for "naphthyl), each occurrence, read -- naphthyl)- --.

Signed and sealed this 3rd day of March 1964.

(SEAL)
Attest:
ERNEST W. SWIDER
Attesting Officer

EDWIN L. REYNOLDS
Acting Commissioner of Patents